United States Patent [19]
Takaguchi

[11] Patent Number: 6,113,305
[45] Date of Patent: Sep. 5, 2000

[54] CONTAINER COUPLING TOOL

[75] Inventor: Hiroyuki Takaguchi, Nagasaki, Japan

[73] Assignee: Taiyo Seiki Iron Works Co., Ltd., Osaka, Japan

[21] Appl. No.: 09/062,729

[22] Filed: Apr. 20, 1998

[51] Int. Cl.[7] .............................. F16B 2/00; B65D 21/02
[52] U.S. Cl. ........................... 403/321; 24/287; 403/335; 403/374.5
[58] Field of Search .................................. 403/338, 335, 403/373, 374.5, 322.4, 321; 24/287, 297, 455

[56] References Cited

U.S. PATENT DOCUMENTS

| | | | |
|---|---|---|---|
| 3,261,070 | 7/1966 | Abolins | 24/287 |
| 3,593,387 | 7/1971 | Georgi | 24/287 |
| 3,691,595 | 9/1972 | Backteman et al. | 24/287 |
| 3,697,104 | 10/1972 | Soulie et al. | 403/322.1 |
| 3,746,377 | 7/1973 | De Neveu et al. | 24/287 |
| 3,894,493 | 7/1975 | Strecker | 24/287 |
| 4,732,505 | 3/1988 | Gloystein | 24/287 |
| 5,062,752 | 11/1991 | Takaguchi | 24/287 |
| 5,548,877 | 8/1996 | Nitsche | 24/287 |
| 5,676,271 | 10/1997 | Reynard | 24/287 |

FOREIGN PATENT DOCUMENTS

646389  8/1962  Canada ................................... 24/287

*Primary Examiner*—Lynne H. Browne
*Assistant Examiner*—Kenneth Thompson
*Attorney, Agent, or Firm*—Wenderoth, Lind & Ponack, L.L.P.

[57] ABSTRACT

A container coupling tool including a tool body having a flange and positioning protrusions provided on top and bottom of the flange. The tool body is formed with a bore extending therethrough from the top surface of one of the protrusions to the bottom surface of the other. A rotary shaft is received in the bore and has at its top and bottom ends top and bottom cones. Also, handle is inserted in a hole formed in the tool body and is coupled to the rotary shaft. The tool body is formed with a stopper hole opening to the bottom of the flange and communicating with the bore. A stopper having a stopper pin is vertically movably inserted in the stopper hole. The rotary shaft is provided on its outer periphery with engaging projections adapted to oppose the stopper pin in the circumferential direction of the rotary shaft when the stopper pin is received on the bottom end of the stopper hole with the tool body used in an upside down position, thereby preventing the rotary shaft from rotating toward a position where one of the top and bottom cones disengages.

5 Claims, 7 Drawing Sheets

CONTAINER COUPLING TOOL

BACKGROUND OF THE INVENTION

This invention relates to a container coupling tool for coupling containers laid one on another.

Shipping containers are laid in many tiers on a ship and transported. If they were simply laid one on another, they might collapse when the ship rolls and pitches on the water. Thus, each container is coupled to the containers immediately above and below by container coupling tools.

One known container coupling tool comprises a tool body having top and bottom protrusions which can snugly fit in holes formed in container corner fittings. The tool body is formed with a bore extending from the top face of the top protrusion to the bottom face of the bottom protrusion. A rotary shaft is rotatably inserted in the bore. A top cone and a bottom cone are secured to the top and bottom of the rotary shaft over and under the top and bottom protrusions. By pivoting the handle, the top and bottom cones are turned together with the rotary shaft between two positions where they engage and disengage from the upper and lower containers, respectively.

To couple two containers together with such a container coupling tool, the handle of each coupling tool is pivoted to turn the rotary shaft to the position where the entire top cone is inside the perimeter of the top protrusion. In this state, the top cone of each coupling tool is inserted into the hole of the respective bottom corner fitting of a container hung in the air by e.g. a lifting spreader. Then, with the top cone received in the corner fitting, the handle is pivoted to turn the rotary shaft to the position where the top cone engages in the corner fitting hole and the entire bottom cone is inside the perimeter of the bottom protrusion. The coupling tools are thus coupled to the container.

The container is then placed on another container by inserting the bottom protrusion into the respective top corner fitting holes of the lower container, and the handle is pivoted to turn the rotary shaft to the position where both ends of the bottom cone engage in the respective corner fitting hole.

When a container is hung in the air with the coupling tools of this type coupled to its bottom, if the handle of any coupling tool is turned inadvertently by e.g. colliding against an object, its top cone may disengage and the coupling tool may drop from the container.

In order to solve this problem, the container coupling tool disclosed in examined Japanese utility model publication 5-23514 has a locking means for preventing the top cone from turning to its unlocked position to prevent the dropout of the coupling tool.

In order to prevent undue turning of the top cone when the coupling tool is used either upside up or down, the locking means are made up of a large number of parts. Assembling such a coupling tool is very troublesome and its manufacture is costly.

An object of this invention is to provide a container coupling tool which can reliably keep the topside cone engaged and which is small in number of parts and thus easy to assemble.

SUMMARY OF THE INVENTION

According to this invention, there is provided a container coupling tool comprising a tool body having a flange and positioning protrusions provided on top and bottom of the flange. The tool body is formed with a bore extending therethrough from the top surface of one of the protrusions to the bottom surface of the other. A rotary shaft is received in the bore and has at its top and bottom ends top and bottom cones. A handle is inserted in a hole formed in the tool body so as to open to the outer periphery of the flange and is coupled to the outer periphery of the rotary shaft. The top and bottom cones can be detachably engaged in holes formed in corner fittings of containers by pivoting the handle. The tool body is formed with a stopper inserting hole opening to the bottom of the flange and communicating with the bore. A stopper vertically movably inserted in the stopper inserting hole and has its inner end opposed to the bore and supported so that when the stopper moves down by gravity, the stopper partially protrudes outwardly from a bottom opening of the stopper inserting hole. Also, an engaging projection is formed on the outer periphery of the rotary shaft so as to oppose the inner end of the stopper in the circumferential direction of the rotary shaft when the stopper has moved down by gravity, thereby preventing the rotary shaft from rotating toward a position where the top cone disengages.

Other features and objects of the present invention will become apparent from the following description made with reference to the accompanying drawings, in which:

DETAILED DESCRIPTION OF THE PREFERRED EMBODIMENT

An embodiment of this invention is now described with reference to the drawings.

Figure 1:
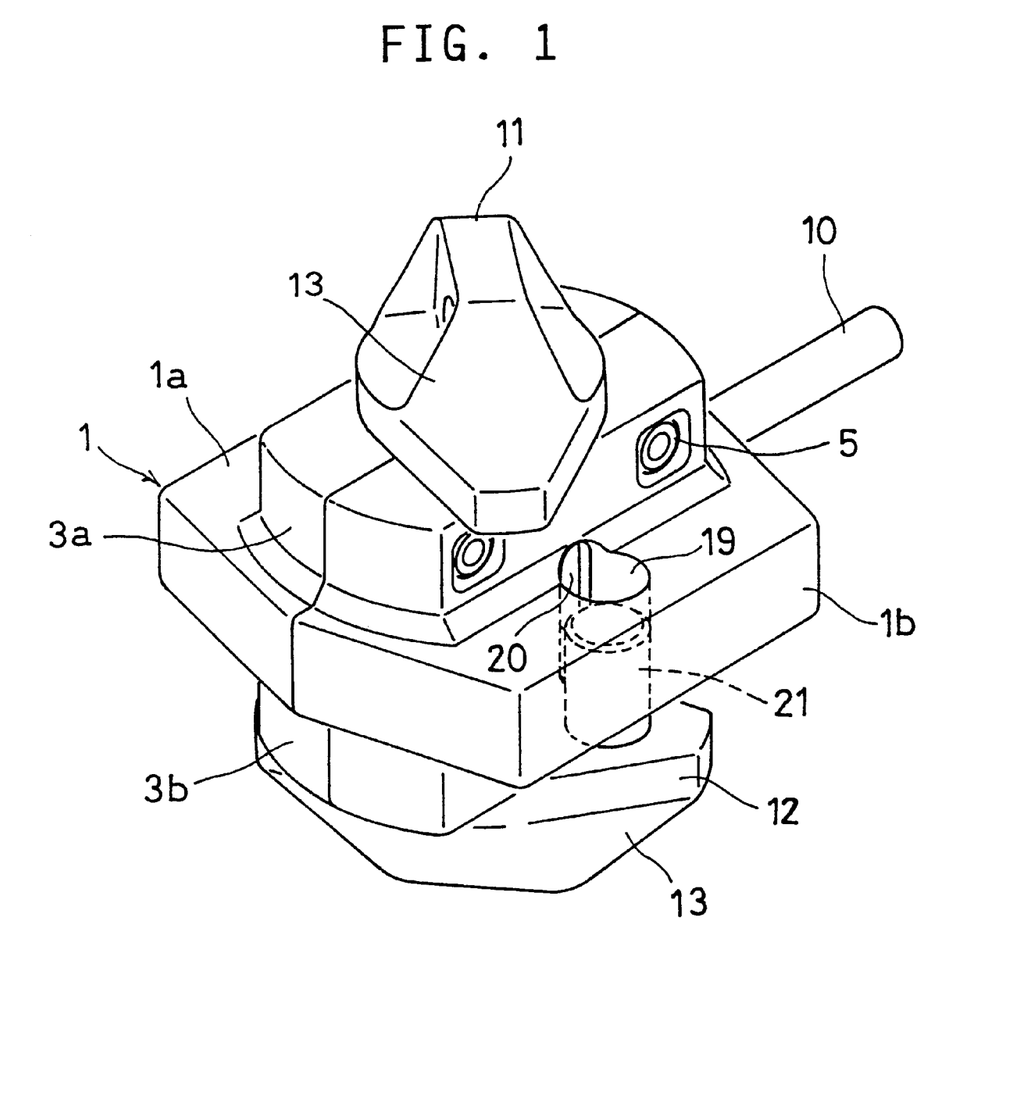
FIG. 1 is a perspective view of a container coupling tool embodying this invention.
Figure 2:
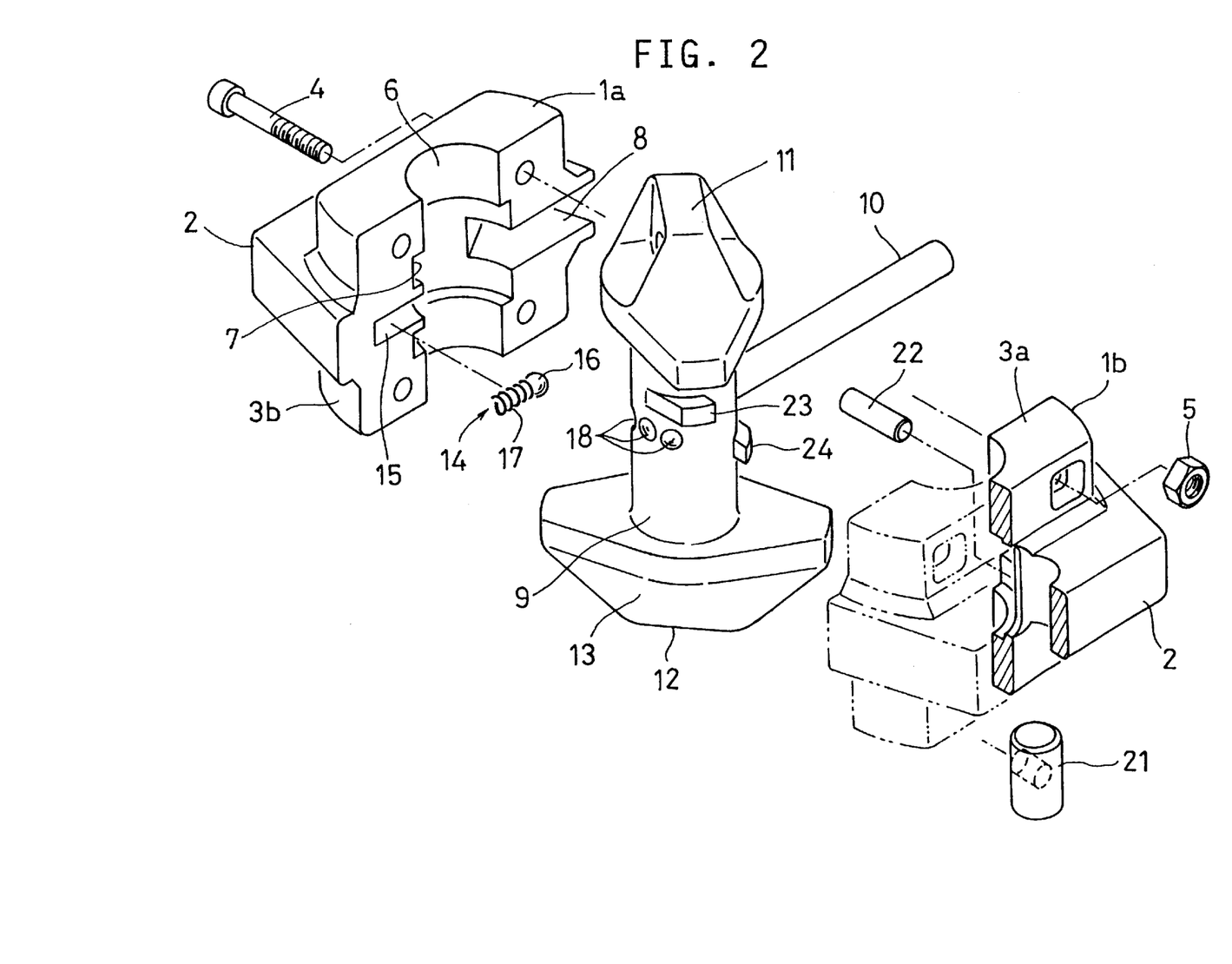
FIG. 2 is an exploded perspective view.
Figure 3A:
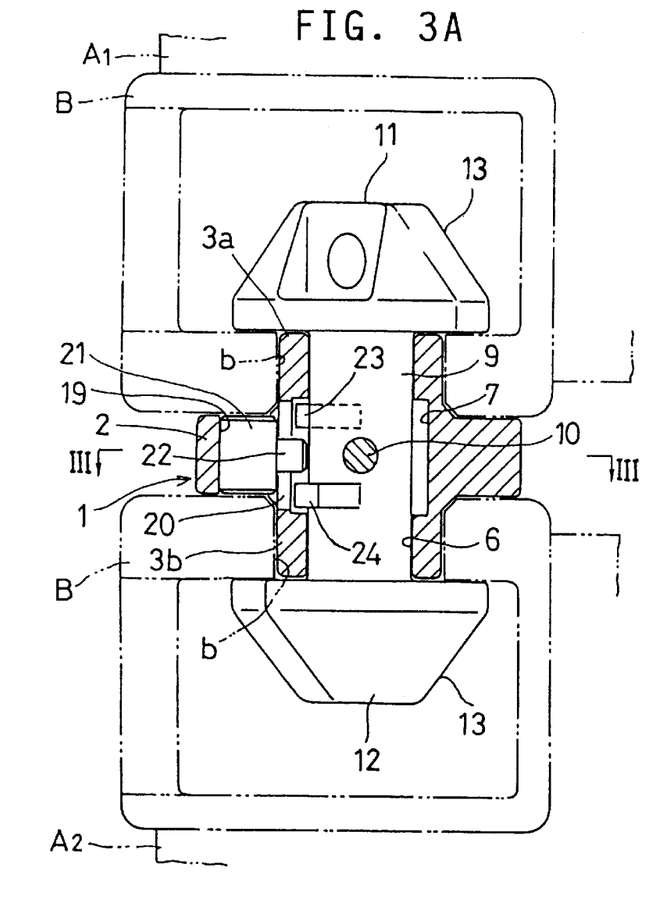
FIG. 3A is a front view in section of the container coupling tool shown in FIG. 1.
Figure 3B:
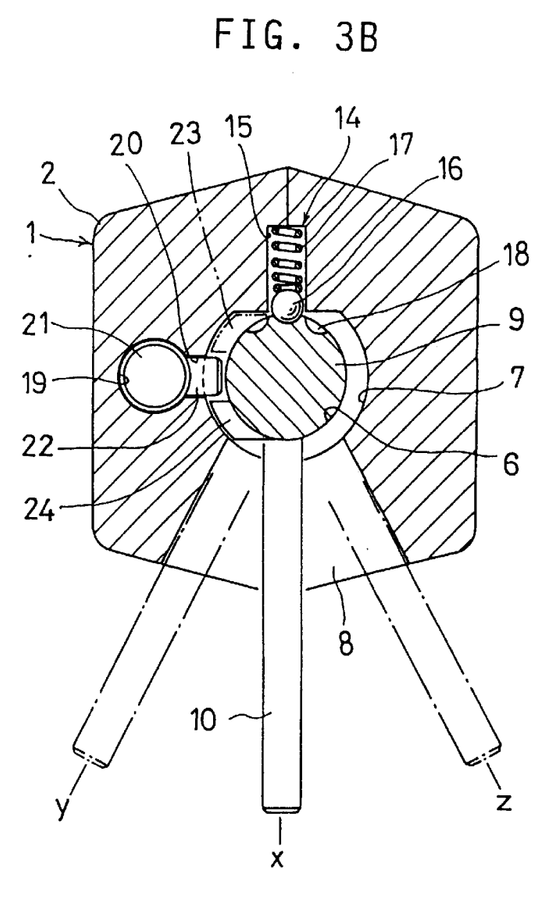
FIG. 3B is a section taken along line III—III of FIG. 3A.

As shown in FIGS. 1–3, a coupling tool body 1 has a flange 2 to be disposed between two stacked containers. Positioning protrusions 3a, 3b are provided on the top and bottom of the flange 2.

The protrusions 3a and 3b are substantially rectangular and have arcuate ends. The protrusions 3a, 3b are sized so as to fit snugly in holes b formed in corner fittings B of containers A1, A2 (FIG. 3A).

The coupling tool body 1 comprises right and left members 1a, 1b coupled together by bolts 4 and nuts 5. The coupling tool body 1 has a bore 6 extending therethrough from the top face of the top protrusion 3a to the bottom face of the bottom protrusion 3b. The bore 6 has a large-diameter portion 7 at its axial center. Communicating with the large-diameter portion 7 is a hole 8 in the shape of a fan having its center on the axis of the bore 6 and opening to the outer periphery of the flange 2.

A rotary shaft 9 is inserted in the bore 6. A handle 10 is inserted in the hole 8 with its inner end coupled to an intermediate portion of the rotary shaft 9 and its outer end protruding from the hole 8.

A top cone 11 and a bottom cone 12 are secured to the top and bottom of the rotary shaft 9 over and under the top and bottom protrusions 3a, 3b, respectively, so as to be rotatable relative to the protrusions 3a, 3b, respectively.

The top and bottom cones 11, 12 are identically shaped and are wider at the central portion, tapering toward both ends, as viewed from the top. Also, each cone 11, 12 has inclined surfaces 13 so that its vertical height decreases gradually toward both ends.

As shown in FIG. 3B, the handle 10 can be temporarily locked by a temporary locking means 14 in three positions, i.e. a first position where it is against one side wall of the hole 8, a second position where it is against the other side wall of the hole 8, and a third position between the first and second positions.

The temporary locking means 14 comprises a ball 16 as an engaging element and a resilient member 17 both mounted in a hole 15 extending radially outwardly from the large-diameter portion 7 such that the ball 16 is biased against the rotary shaft 9 by the resilient member 17. The ball 16 is adapted to engage in one of three semispherical dents or detents 18 forms so as to be, circumferentially arranged, in the rotary shaft 9 to temporarily lock the handle 10 in one of the three positions.

When the handle is in the third position or position x, both the top and bottom cones 11, 12 are in their engaged positions where both of their ends protrude from both sides of the protrusions 3a, 3b.

Figure 6A:
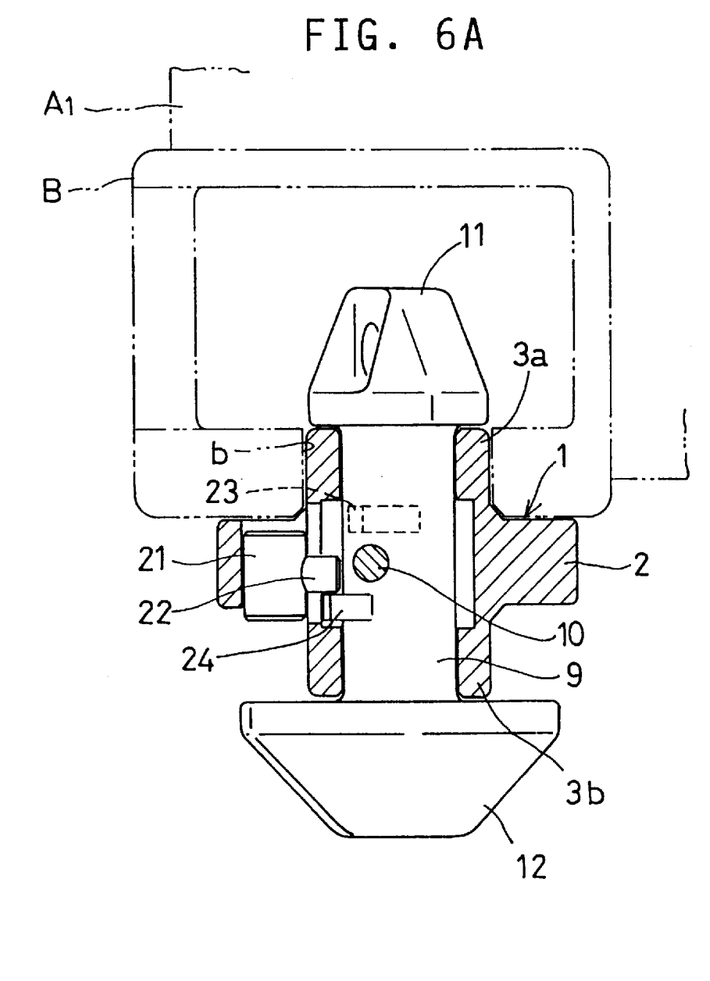
FIG. 6A is a sectional front view of the container coupling tool with the top cone unlocked.
Figure 6B:
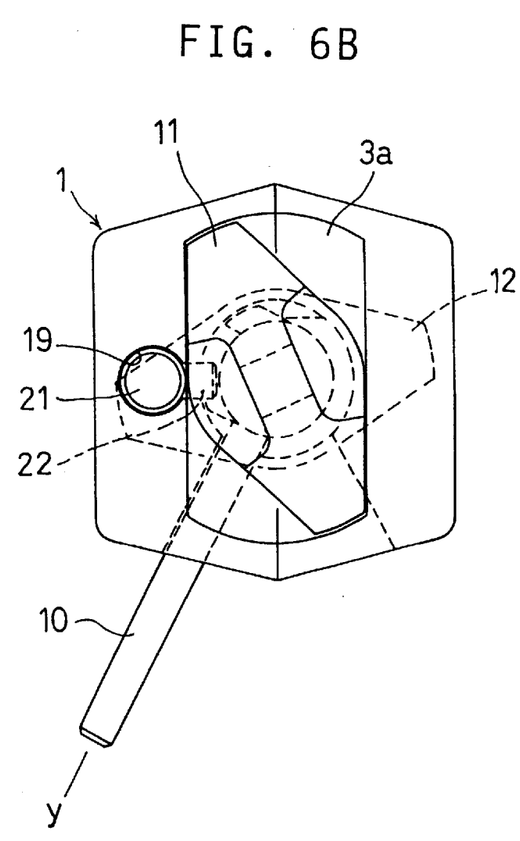
FIG. 6B is a plan view of FIG. 6A.

When the handle 10 is in the position y, top cone 11 is unlocked, that is, is entirely inside the perimeter of the top protrusion 3a as shown in FIG. 6. On the other hand, the bottom cone 12 is in the engaged position with both of its ends protruding from the perimeter of the bottom protrusion 3b.

Figure 4A:
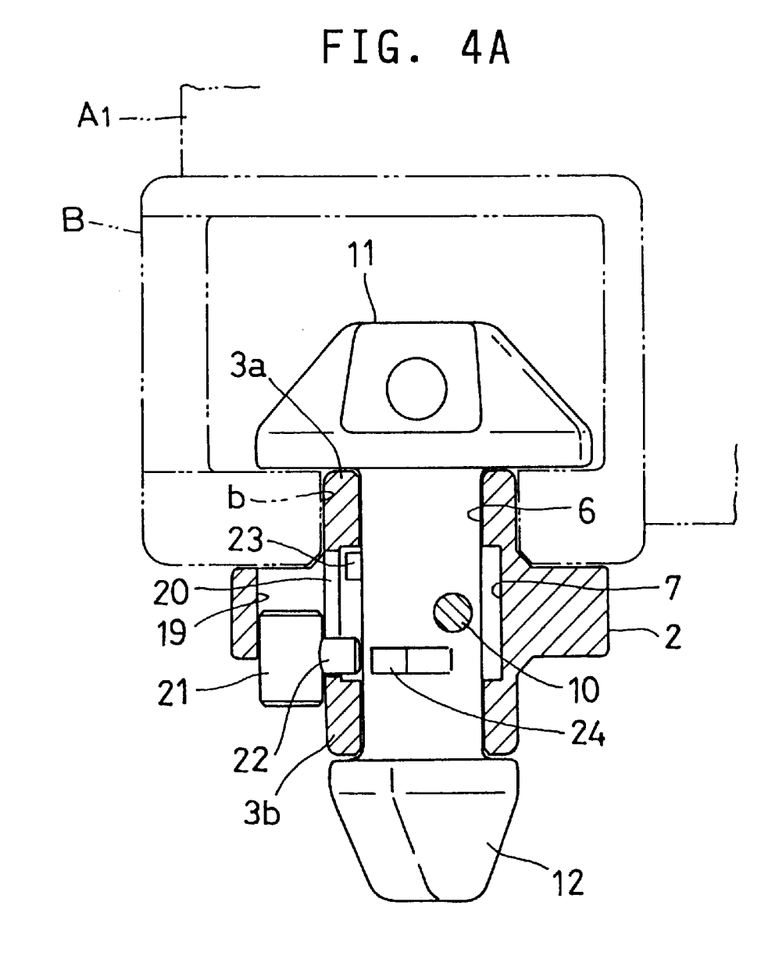
FIG. 4A is a front view of the container coupling tool in section with the bottom cone unlocked.
Figure 4B:
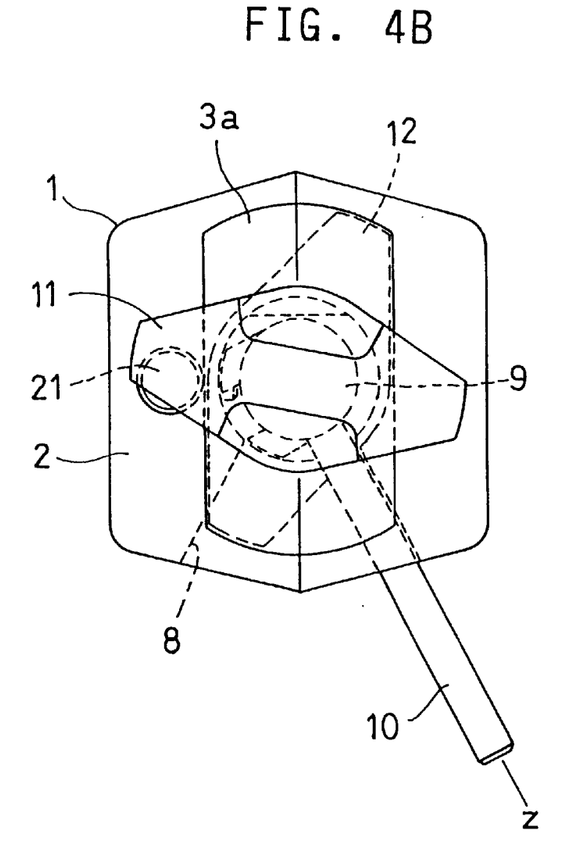
FIG. 4B is a plan view of FIG. 4A.
Figure 5A:
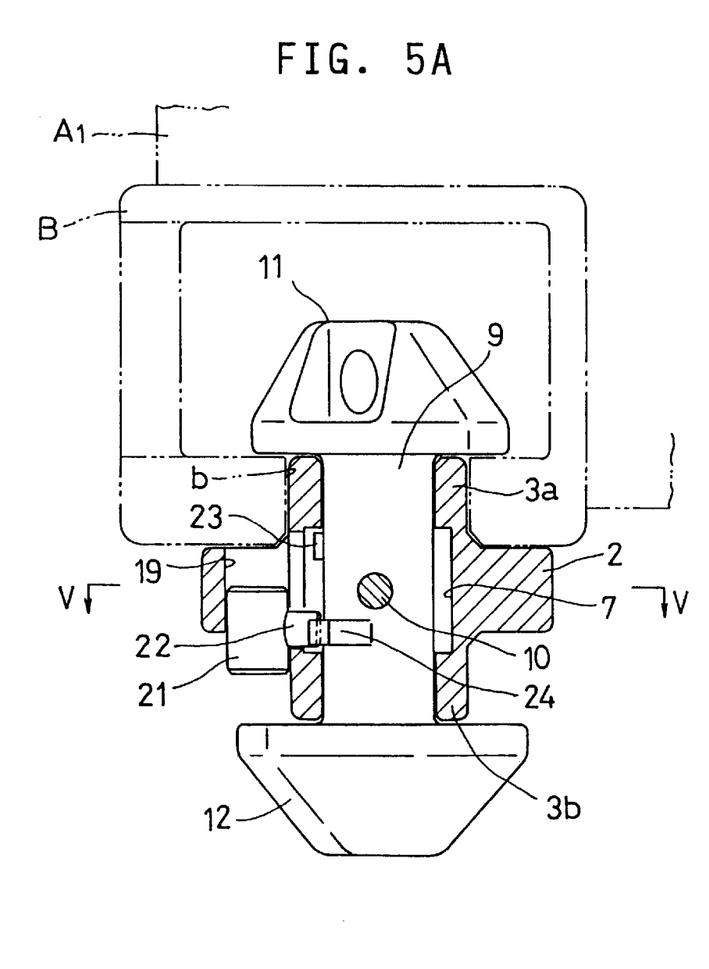
FIG. 5A is a front view of the container coupling tool in section with the top cone locked in position.
Figure 5B:
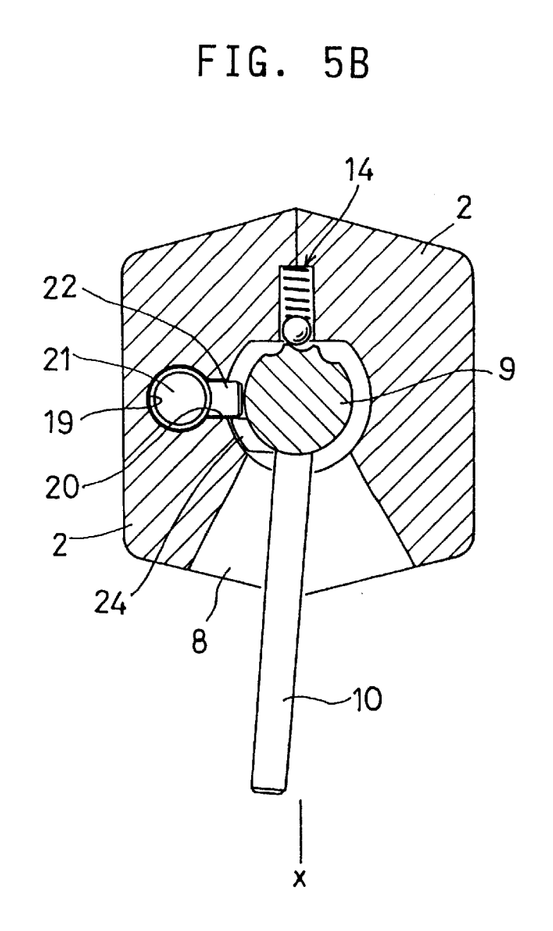
FIG. 5B is a sectional view taken along line V—V of FIG. 5A.

When the handle 10 is in the position z, the bottom cone 12 is unlocked, that is, is entirely inside the perimeter of the bottom protrusion 3b as shown in FIG. 4. On the other hand, the top cone 11 is in the engaged position with both of its ends protruding from the perimeter of the top protrusion 3a.

Now referring to FIGS. 1 and 3, the coupling tool body 1 is formed with a hole 19 opening in the top and bottom surfaces of the flange 2. A stopper 21 is mounted in the hole 19.

The hole 19 is a vertical hole extending through the flange 2. A vertically elongate guide hole 20 establishes communication between the vertical holes 19 and the large-diameter portion 7 of the hole 6.

The stopper 21 comprises a slide shaft slidably inserted in the vertical hole 19, and a stopper pin 22 coupled to an intermediate portion of the slide shaft so as to be slidable in the guide hole 20. The slide shaft of stopper 21 has a length that is substantially equal to the thickness of the flange 2.

The rotary shaft 9 has on its outer periphery a first engaging projection 23 and a second engaging projection 24 spaced axially a distance substantially equal to the distance the stopper pin 21b can slide.

When in abutment with the top end of the guide hole 20, the stopper pin 22 is disposed circumferentially opposite the first engaging projection 23. Thus, in this state, when the handle 10 is pivoted from the position x toward the position z, the first projection 23 abuts the stopper pin 22, preventing the handle 10 from further pivoting toward position z.

On the other hand, when the stopper pin 22 is in abutment with the bottom end of the guide hole 20, the stopper pin 21b is disposed circumferentially opposite the second engaging projection 24. Thus, in this state, as soon as the handle 10 is pivoted from the position x toward the position y, the second projection 24 abuts the stopper pin 21b, preventing the handle 10 from further pivoting toward position y.

FIG. 3A shows how upper and lower containers A1, A2 are coupled together by the container coupling tool of the embodiment. In the state shown, the top protrusion 3a is inserted in a hole b formed in a bottom corner fitting B of the upper container A1, while the bottom protrusion 3b is inserted in a hole b formed in a top corner fitting B of the lower container A2.

The handle 10 is temporarily locked in the position x, so that both ends of the top and bottom cones 11, 12 protrude from the perimeter of the respective protrusions 3a, 3b, thus engaging the containers A1, A2, which are thus coupled together.

To unload the upper container A1 from the lower container A2, the handle 10 shown in FIG. 3 is pivoted to the position z to unlock the bottom cone 12, and then the upper container A1 is lifted.

By turning the handle 10 to position z, the bottom cone 12 is turned together with the rotary shaft 9 to a position where it is entirely inside the perimeter of the bottom protrusion 3b, as shown in FIG. 4.

Thus, by lifting the upper container A1 in this state, the bottom protrusion 3b comes out of the hole b of the top corner fitting B of the lower container A2, so that the entire coupling tool is raised together with the upper container A1.

As the upper container A1 is lifted, the stopper 21 moves down by gravity relative to the tool body 1 until the stopper pin 22 abuts the bottom end of the guide hole 20. In this state, the stopper pin 22 is disposed circumferentially opposite the second projection 24, so that the handle 10 can be turned to position x but not from position x toward position y.

Since the handle 10 cannot be turned to position y while the upper container A1 is hung in the air, the top cone 11 is securely held in the hole b of the corner fitting B of the upper container A1. The coupling tool will thus never drop from the container.

To remove the container coupling tool from the upper container A1, the slide shaft of the stopper 21 is pushed up until the stopper pin 22 is axially offset from the second projection 24 as shown in FIG. 6A. Holding the stopper 21 in this position, the handle 10 is turned to position y to unlock the top cone 11. Then, by pulling down on the coupling tool, the top protrusion 3a will come out of the hole b.

To put the upper container A1 on the lower container A2, the container A1 is lifted by e.g. a lifting spreader, the top protrusion 3a is inserted into a hole b of a bottom corner fitting of the container A1, and the handle 10 is turned from position y to position z to unlock the bottom cone 12 and engage the top cone 11 with the upper container A1. In this state, the container A1 is deposited on the container A2 to let the bottom protrusion 3b fit in a hole b of a top corner fitting B of the lower containers A2. The handle 10 is then turned to position x to cause the bottom cone 12 to engage the lower container A2.

Since the top cone 11 and the bottom cone 12 are identically shaped, the container coupling tool of the embodiment can be used in an upside down position. In such a case, when the upper container A1 is lifted with the coupling tool coupled to its bottom as shown in FIG. 4, the stopper 21 is held in such a position that the stopper pin 22 is disposed circumferentially opposite the second projection 24.

The handle 10 is thus prevented from turning toward the position in which the top cone is unlocked and disengaged. It is thus possible to prevent the coupling tool from dropping even when it is used in an upside down position.

Figure 7:
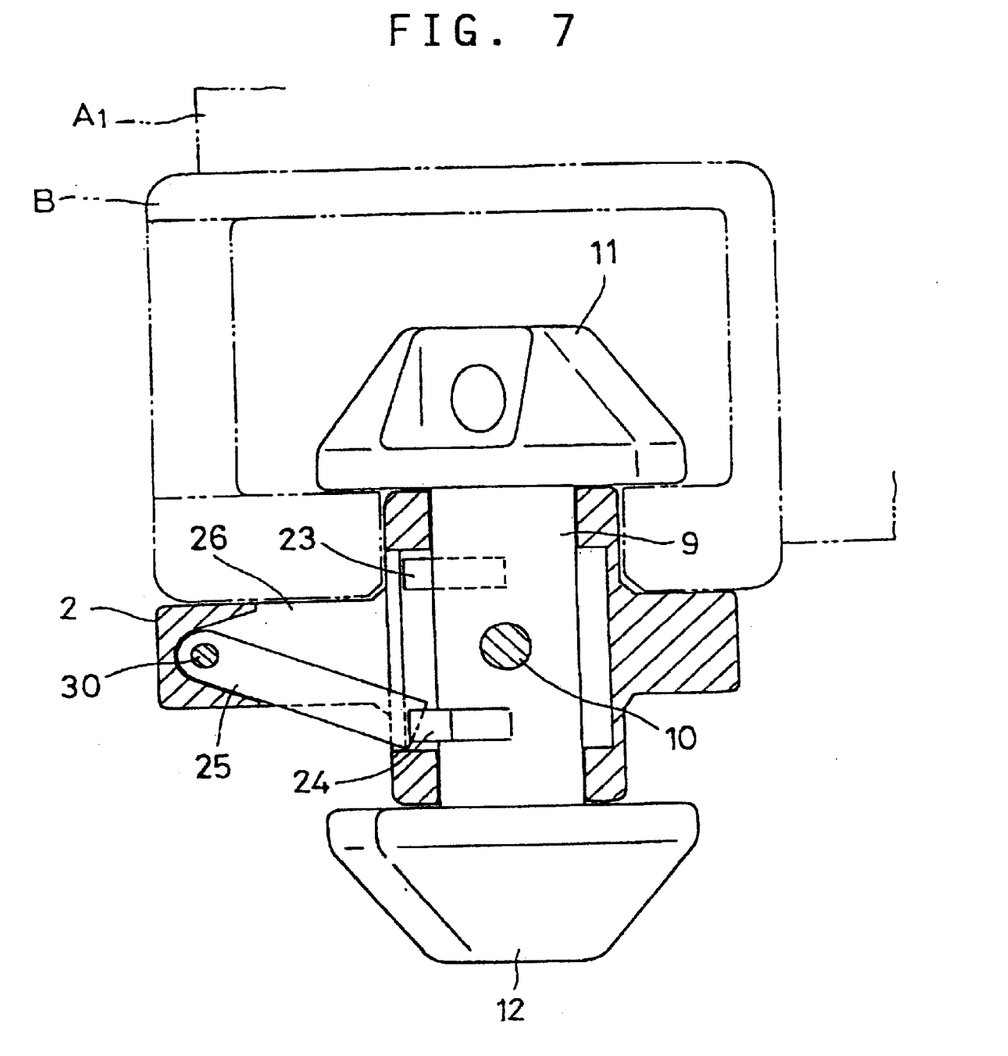
FIG. 7 is a sectional view of another container coupling tool embodying this invention.

FIG. 7 shows another coupling tool embodying this invention. In this embodiment, a bar or stopper 25 is inserted in an elongate hole 19 formed in the tool body 1 perpendicularly to the rotary shaft 9. The stopper 25 has its outer end pivotally supported by a pin 30 so that when it pivots downward by gravity, it partially protrudes downward from the bottom opening of the hole 26. In this state, the inner end of the stopper 25 is disposed opposite a second engaging projection 24 provided on the rotary shaft 9 as shown, or opposite a first engaging projection 23 if the tool is used upside down.

In either case, the stopper 25 prevents the rotary shaft 9 from turning to the position where the top cone 11 disengages. Thus, the top cone is kept in an engaged position. This prevents the container coupling tool from dropping from the upper container when it is hung in the air.

The container coupling tool can be used in an upside down position.

As described above, according to this invention, when a container is hung in the air with the container coupling tools of the invention coupled to the bottom of the container, the stopper of each coupling tool lowers by gravity until its inner end opposes the engaging projection in the circumferential direction of the rotary shaft. This prevents the handle from pivoting toward the position where the top cone disengages. The coupling tools thus never drops from a container when the container is in the air.

The stopper means is made up of a small number of parts, i.e. stopper and engaging projections, so that it is simple in structure and easy to assemble. Further, the container coupling tool can be used either upside up or upside down.

What is claimed is:

1. A container coupling tool comprising:
   a tool body having a flange, a top positioning protrusion provided on a top surface of said flange, and a bottom positioning protrusion provided on a bottom surface of said flange,
   said tool body being formed with a bore extending from a top surface of one of said protrusions to a bottom surface of the other of said protrusions;
   a rotary shaft received in said bore;
   a top cone provided on a top end of said rotary shaft;
   a bottom cone provided on a bottom end of said rotary shaft;
   a handle inserted in a hole formed in said tool body, said hole opening at an outer periphery of said flange, and said handle being coupled to an outer periphery of said rotary shaft,
   wherein said top and bottom cones can be detachably engaged in openings formed in corner fittings of containers by pivoting said handle,
   said tool body being formed with a stopper inserting hole, which is open at the bottom surface of said flange and communicates with said bore;
   a stopper vertically movably inserted in said stopper inserting hole, said stopper having an inner end positioned adjacent said rotary shaft,
   said stopper being supported in said stopper inserting hole so as to permit said stopper to move downward in said stopper inserting hole by gravity so that said stopper partially protrudes outwardly from a bottom opening of said stopper inserting hole; and
   a first engaging projection formed on an outer periphery of said rotary shaft so as to oppose the inner end of said stopper in a circumferential direction of said rotary shaft when said stopper has moved down by gravity, thereby preventing said rotary shaft from rotating toward a position where said top cone can be disengaged from the corner fitting,
   wherein, when said stopper is completely inserted in said stopper inserting hole, the stopper does not prevent rotation of said rotary shaft.

2. A container coupling tool as claimed in claim 1, wherein said stopper inserting hole comprises a vertical hole opening in the bottom surface of said flange and a vertically elongated guide hole through which said vertical hole communicates with said bore, and wherein said stopper comprises a slide shaft slidably inserted in said vertical hole, and a stopper pin extending from an intermediate portion of said slide shaft so as to be slidable along said vertically elongated guide hole.

3. A container coupling tool as claimed in claim 2, further comprising a second engaging projection formed on the outer periphery of said rotary shaft,
   wherein said stopper pin opposes said second engaging projection in a circumferential direction of said rotary shaft when said stopper pin is received on a terminal end of said guide hole when said tool body used in an upside down orientation, thereby preventing said rotary shaft from rotating toward a position where one of said top and bottom cones can be moved to a disengage position.

4. A container coupling tool as claimed in claim 1, wherein aid stopper comprises a bar having an outer end which is pivotally supported by said tool body.

5. A container coupling tool as claimed in claim 4, further comprising a second engaging projection formed on an outer periphery of said rotary shaft,
   wherein said stopper inserting hole is a through hole that opens in the top and bottom surfaces of said flange, and
   wherein an inner end of said bar opposes said second engaging projection in a circumferential direction of said rotary shaft when said bar has moved down by gravity when said tool body used in an upside down orientation, thereby preventing said rotary shaft from rotating toward a position where a topside one of said top and bottom cones can be moved to a disengage position.

* * * * *